[11] 3,588,439

| [72] | Inventors | Macy E. Heller<br>Trenton;<br>Hendrik J. Gerritsen, Princeton Junction, N.J. |
|---|---|---|
| [21] | Appl. No. | 638,105 |
| [22] | Filed | May 12, 1967 |
| [45] | Patented | June 28, 1971 |
| [73] | Assignee | RCA Corporation |

[54] HIGH RESOLUTION LASER ENGRAVING APPARATUS
12 Claims, 2 Drawing Figs.

[52] U.S. Cl. ............................................. 219/121, 346/76, 350/3.5
[51] Int. Cl. ........................................... G02b 27/22, B23k 9/00, G01d 15/10
[50] Field of Search ............................................. 346/76; 350/3.5; 219/121

[56] References Cited
UNITED STATES PATENTS
3,314,073  4/1967  Becker ........................... 346/76
3,381,127  4/1968  Spielberg ........................... 350/3.5
3,410,203  11/1968  Fischbeck ........................... 350/3.5X OTHER REFERENCES
Jacobson and McClung, APPLIED OPTICS, Vol. 4 No. 11, pp. 1509— 1510, (11/1965).
Roshon et al., IBM TECH. DISC. BULLETIN, Vol. 7 pp. 224— 225 (8/1964).

*Primary Examiner*—David Schonberg
*Assistant Examiner*—Robert L. Sherman
*Attorney*—Edward J. Norton ABSTRACT: A pulsed laser illuminates an entire given area of the surface of a member to be engraved with coherent light which varies in relative intensity from point to point over its cross section in accordance with a predetermined pattern. It has been found that if the absolute intensity and time of duration of the pulse of coherent light are proper, it is possible to obtain engravings in which details of the order of 2 microns in the engraved pattern can be resolved. This makes it possible to engrave not only pictorial patterns, but also hologram patterns.

PATENTED JUN 28 1971

3,588,439

INVENTORS
MACY E. HELLER &
HENDRIK J. GERRITSEN
BY Edward J. Norton
ATTORNEY

HIGH RESOLUTION LASER ENGRAVING APPARATUS

This invention relates to high resolution engraving apparatus and, more particularly, to such apparatus for engraving very fine patterns on a normally solid material member by momentarily illuminating all of an entire given area of a surface of the member for a specified time duration with given coherent light of specified absolute intensity having a cross section equal to the area, which light varies in relative intensity from point to point over its cross section in accordance with the pattern to be engraved.

The use of focused coherent light from a laser for "drilling" small holes in a solid material member is known in the art. In this process a pulse of coherent light from a high-power Q-switched laser is focused by a lens system on a point of the member. Depending upon the absolute intensity and time duration of the pulse produced by the laser, the diameter of a hole "drilled" by this process is 10 microns or more. Further, the depth of the hole produced by this process is quite deep. Microscopic examination of a hole "drilled" by this process shows that the evaporation of the material to form the hole occurs in cataclysmic fashion, the inside surface of the hole being composed of resolidified molten material. This causes the hole to have a craterlike appearance. From the foregoing, it is clear that the process of "drilling" a hole with focused coherent light from a laser is an essentially disorderly process.

Since "drilling" the hole by means of a laser is an essentially disorderly process, it was assumed in the prior art that it was not possible to produce high resolution engravings of very fine patterns on a normally solid member by evaporating material from the member in an orderly fashion by means of coherent light from a laser. However, it has been found that if coherent light from a laser is not focused on a point on the surface of the normally solid member, but is projected over an entire given area of the surface, and if the absolute intensity and duration of the coherent light are proper, no significant amount of heat transfer will take place from point to point of the given area and high resolution engravings of fine patterns can be engraved on this given area by varying the relative intensity of the coherent light from point to point over this given area in accordance with the pattern to be engraved.

It is therefore an object of the present invention to provide a high resolution engraving apparatus utilizing coherent light from a laser.

This and other objects, features and advantages of the present invention will become more apparent from the following detailed description taken together with the accompanying drawing, in which.

Figure 1:
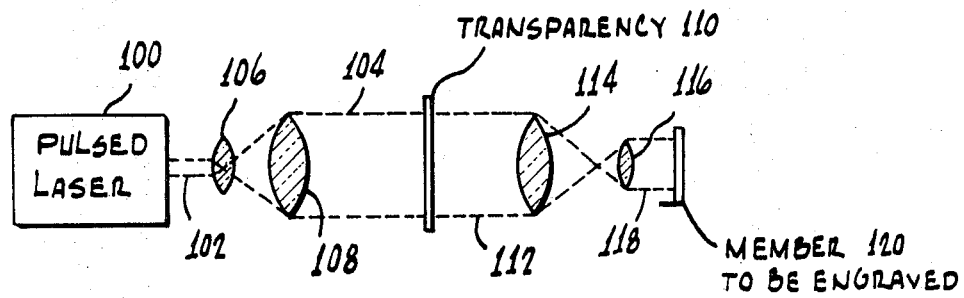
FIG. 1 is a block diagram of a first embodiment of the present invention.

Referring now to FIG. 1, there is shown a pulsed laser 100 which during each pulse thereof produces beam 102 of coherent light. Beam 102 is widened into beam 104 by means of lenses 106 and 108. Beam 104 is shone through a transparency 110 which incorporates the predetermined pattern to be engraved. Transparency 110, by differential absorption of the light from point to point in accordance with the predetermined pattern thereon, causes the relative intensity of the coherent light in beam 112 emerging from the transparency 110 to vary from point to point in accordance with the predetermined pattern. Thus, the intensity of beam 112 over its cross section is effectively spatially modulated in accordance with the information in the predetermined pattern.

Beam 112 is narrowed by means of lenses 114 and 116 into a beam 118. Beam 118 is then projected on a given surface area of member 120 which is to be engraved.

It has been found that if the duration of the coherent light pulse from pulsed laser 100 has the proper short time duration (which depends upon the particular material of which member 120 is composed, but which in no case is greater than 100 nanoseconds) and the amplitude of the coherent light produced by pulsed laser 100 is sufficiently high, it is possible to obtain an engraving on member 120 having an area of several square millimeters while details of the order of 2 microns in the engraved pattern can be resolved. Further, the maximum depth of evaporation is also in the order of 2 microns.

Member 120 may be composed of a metal, such as copper, for instance, or a semiconductor, such as silicon, for instance.

In one case an engraving of a pattern having dimensions of 2.4×0.8 mm., and having a resolution in the order of 2 microns was produced on a copper member utilizing a laser pulse having 2 joules of energy in its duration of 30 nanoseconds. In general, the impinging flux can be between $10^9$ and $10^{10}$ watts per square cm. to produce good results.

Although in FIG. 1 a transparency 110 is utilized to modulate the cross section of the coherent light with information of the pattern to be engraved, it is clear that spatial modulation of the relative intensity of the beam from point to point may be obtained by variable reflection or scattering of light, rather than by variable absorption from point to point, as is the case with transparency 110.

Figure 2:
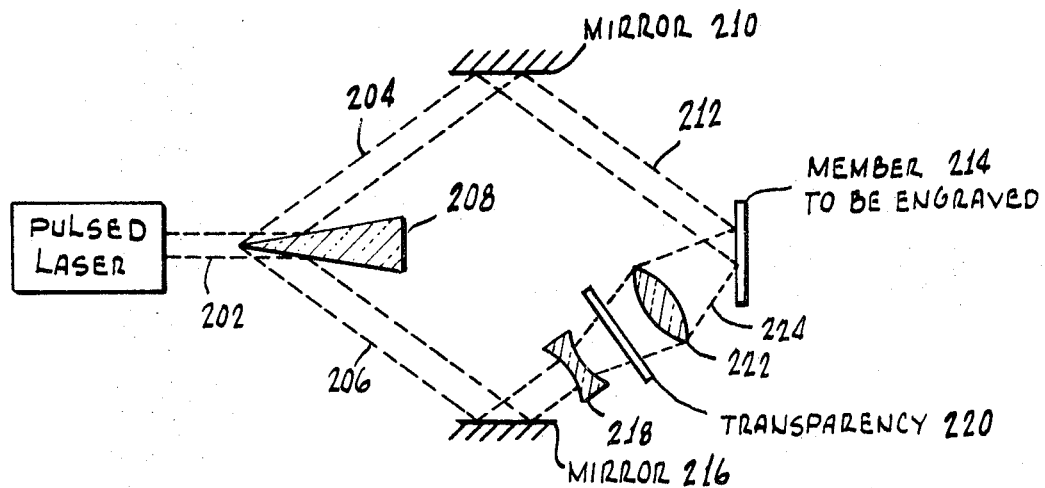
FIG. 2 is a block diagram of a second embodiment of the present invention.

Referring now to FIG. 2, there is shown apparatus for engraving a hologram of a scene shown in a transparency as the pattern to be engraved, rather than the scene itself.

More particularly, as shown in FIG. 2 pulsed laser 200 produces beam 202 of coherent light, which is split into first component beam 204 and second component beam 206 by quartz wedge beam splitter 208. Beam 204 is reflected from mirror 210 to form reference beam 212 which is directed to a given area of member 214 to be engraved. Beam 206 is reflected from mirror 216 and after being widened by diverging lens 218 is spatially modulated by the pattern incorporated in transparency 220. After being spatially modulated, the beam of light emerging from transparency 220 is narrowed by convex lens 222 and projected as information beam 224 on the same given area of member 214 on which reference beam 212 is projected.

Information beam 224 and reference beam 212 will produce an interference pattern on the given area of member 214. This interference pattern forms a hologram made up of light and dark fringe lines spaced from each other by an amount in the order of 2 microns. It will be seen that this interference pattern will be engraved on member 214 in the same manner as the pattern projected on member 120, as described above. Thus, the present invention may be utilized to engrave hologram patterns, as well as pictorial patterns. The hologram also may be of a three-dimensional object rather than a transparency, as is known in the hologram art.

By making member 214 out of a magnetic material, the pattern may be "engraved" in magnetic form. For instance, if the member to be engraved in either FIG. 1 or FIG. 2 is a thin film of already magnetized magnetic material, either in pure form or suspended in a binder, and the absolute magnitude of the pulsed laser is insufficient to cause evaporation of the material, but sufficient to cause relative loss of magnetization of the material from point to point by heating in accordance with the relative intensity of the light reaching that point, a nondestructive magnetic engraving may be obtained.

If the intensity of the laser is sufficient to cause a partial loss of material according to the relative intensity of the coherent light reaching the thin film of magnetic material, it will result in the predetermined pattern not only being visibly engraved in the material, but, by magnetizing the material either before or after the application of the pulse of coherent light, will result in a magnetic field which is altered in accordance with the thickness of the thin film and, therefore, manifests in magnetic form the engraved pattern.

Although only certain preferred embodiments of the invention have been described in detail herein, it is not intended that the invention be restricted thereto, but that it be limited by the true spirit and scope of the appended claims.

We claim:

1. High resolution engraving apparatus comprising a thermally conductive, substantially homogeneous, normally solid material member having a given surface area on which a predetermined pattern including fine detail is to be engraved, said member being characterized at each point thereof by a property which is altered in accordance with the amount of heat which is absorbed at that point, whereby there is a tendency for the resolution of said fine detail to be degraded by thermally conducted heat transfer between adjacent points of said member, and engraving means for momentarily simultaneously illuminating by projection all points of said entire area for the same specified time duration with a single given beam of coherent light of specified absolute intensity having a cross section equal to said area, which light varies in relative intensity from point to point over its cross section in accordance with said predetermined pattern to be engraved to thereby differentially heat each point of said area simultaneously in accordance with the relative intensity of the light impinging on that point of said area, said specified absolute intensity and said specified time duration of said light being sufficient to simultaneously alter said property at those certain points of said member required to effect the engraving of said pattern including fine detail on said member but being insufficient to permit any significant amount of heat transfer from any one point to any other point of said area, whereby resolution of said fine detail of said pattern is not degraded in said engraving.

2. The apparatus defined in claim 1, wherein said specified time duration is 100 nanoseconds at most.

3. The apparatus defined in claim 1, wherein said solid material of said member is vaporable and wherein the intensity of said light at each of said certain points is sufficient to evaporate said solid material thereat within said specified time duration.

4. The apparatus defined in claim 3, wherein the amount of solid material evaporated from each respective one of said certain points and therefore the depth of engraving at each respective one of said certain points is a direct function of the relative intensity of said light at that certain point to provide an engraving of said pattern on said area of said member.

5. The apparatus defined in claim 4, wherein said predetermined pattern is manifested by the variation in relative intensity of said light from point to point over its cross section and wherein said pattern includes details spaced from each other by no more than 2 microns, whereby said details are resolved in said engraving.

6. The apparatus defined in claim 1, wherein said engraving means includes a pulsed laser for producing a beam of coherent light of predetermined absolute intensity having a duration of 100 nanoseconds at most, and light-modifying means having said beam applied thereto for illuminating said area with said given coherent light.

7. The apparatus defined in claim 6, wherein said light-modifying means includes intensity-varying means for varying the relative intensity of light from point to point in the cross section of said beam in accordance with said pattern and then illuminating said area with said modified beam.

8. The apparatus defined in claim 7, wherein said intensity-varying means comprises a transparency containing said pattern through which said beam is shone.

9. The apparatus defined in claim 6, wherein said light-modifying means includes means for splitting said beam into first and second spatially separated component beams, means for directly illuminating said area with said first component beam and simultaneously illuminating said area with light obtained from an object illuminated by said second component beam, wherein said area illuminated by an interference pattern of coherent light manifesting a hologram of said object.

10. The apparatus defined in claim 1 wherein said member is a magnetized magnetic film.

11. The apparatus defined in claim 10, wherein said property is the magnetized state at each point of said film, and wherein said specified absolute intensity and specified time duration of said light are sufficient to cause relative loss of magnetization of said film but are insufficient to cause evaporation of said film, whereby a nondestructive magnetic engraving is obtained.

12. The apparatus defined in claim 11, wherein said pattern is a hologram.